United States Patent [19]

Jordan et al.

[11] 3,714,040
[45] Jan. 30, 1973

[54] PROCESS OF REGENERATING CARBON BEDS

[75] Inventors: Robert L. Jordan; Norman E. Wilson, both of Fort Worth; Thomas M. Goldman, Houston, all of Tex.

[73] Assignee: Stauffer Chemical Company, New York, N.Y.

[22] Filed: Oct. 16, 1970

[21] Appl. No.: 81,528

[52] U.S. Cl. .................. 252/415, 23/154, 23/167, 55/71, 252/411
[51] Int. Cl. ............................................. B01j 11/02
[58] Field of Search ........ 252/415, 413, 411; 23/154, 23/121; 55/23, 71

[56] References Cited

UNITED STATES PATENTS 3,492,091  1/1970  Goldman et al. ..................... 23/121

3,145,079  8/1964  Harbaugh ............................... 23/154

FOREIGN PATENTS OR APPLICATIONS 248,738  9/1926  Great Britain ........................ 23/154

*Primary Examiner*—Daniel E. Wyman
*Assistant Examiner*—P. E. Konopka
*Attorney*—Daniel C. Block, Edwin H. Baker, Albert J. Adamcik and Harry A. Pacini

[57] ABSTRACT

A process for regenerating activated carbon beds saturated with chlorine is described herein. The process involves injecting sulfur dioxide into the beds. The sulfur dioxide is oxidized by the chlorine to sulfuric acid. The injection of sulfur dioxide is continued until the effluent contains the same amount as the input.

2 Claims, No Drawings

PROCESS OF REGENERATING CARBON BEDS

BACKGROUND OF THE INVENTION

In the art of manufacturing hydrochloric acid, one process involves the reaction of potassium chloride with sulfuric acid at elevated temperatures usually in a gas-fired furnace. Incident to this reaction, sulfur dioxide is also produced. This sulfur dioxide is a contaminant for the final HCl product. In many applications the sulfur dioxide is acceptable, but in other areas even minute quantities are considered highly objectionable. In these instances, the sulfur dioxide must be removed. This is brought about by adding elemental chlorine to the stripper tanks so as to convert the sulfur dioxide to sulfuric acid, which can be readily removed because of its difference in boiling point. As the result of this removal, chlorine is used in excess and thus is carried over into the final hydrochloric acid product. However, the elemental chlorine can be readily removed by separation processes which involves passing the hydrogen chloride solution enriched with elemental chlorine through activated carbon beds. The carbon beds adsorb the elemental chlorine and allow the hydrogen chloride in solution to pass from the beds. Thus, a relatively uncontaminated hydrogen chloride product is produced. For a more detailed description of how hydrogen chloride is manufactured by this process, reference is made to U.S. Pat. No. 3,492,091.

As was pointed out above, the elemental chlorine is removed in activated carbon beds. When the activated carbon bed's capacity for chlorine has been exceeded, free chlorine breaks through the carbon bed and is carried over into the hydrogen chloride product and is considered a contaminant. At this time the chlorinated enriched acid is diverted to an alternate carbon bed or the system is shut down. In order to put the original carbon bed back into service, it was necessary to remove the chlorine saturated carbon particles and recharge the beds with clean or new activated carbon particles. The chlorinated carbon particles were thus discarded. In order to alleviate this discarding of the carbon particles, it has been proposed to pass supersaturated steam through the activated carbon particles to remove the chlorine. However, experience has indicated that this could take up to several days. This practice requires substantial amount of downtime and steam consumption. Moreover, the chlorine removed from the activated carbon must be disposed of.

DESCRIPTION OF THE INVENTION

In the practice of the present invention, the carbon beds that are saturated with chlorine are completely regenerated in a relatively short period of time and put back into service. This is brought about by treating the activated carbon beds with sulfur dioxide after the carbon bed has been removed from the process stream. Thus, the free chlorine in the activated carbon bed oxidizes the sulfur dioxide to hydrochloric acid and sulfuric acid which can be readily removed from the activated carbon beds. In practicing the principals of the present invention, it should be emphasized that the sulfur dioxide is injected into the activated carbon beds at a sufficient rate to completely remove all the free chlorine adsorbed on the activated carbon particles within a relatively short period of time. Thus, the injected flow rate of sulfur dioxide is dictated by the equipment and economics of the operation. It should be noted that the treatment of the carbon beds with sulfur dioxide is continued until the effluent from the carbon bed contains the same amount of sulfur dioxide as the input. Thus, when this set of conditions are satisfied, all the free chlorine on the activated carbon particles has been removed.

When it is desired to put the activated carbon beds back on stream, it is merely necessary to purge the activated carbon beds to remove sulfuric acid and $SO_2$, which components do not adsorb onto the activated carbon particles. It has been found in practice that free chlorine that has been adsorbed onto the activated carbon particles can be completely removed within about 18 to 24 hours.

In order to illustrate the merits of the invention, the following examples are provided:

EXAMPLE I

A carbon bed on stream having about 1,000 lbs. of activated carbon was completely saturated with free chlorine. The carbon bed was removed from a stream and then sulfur dioxide was added to the feed stream at the rate of 75 lbs. per day or about 3 lbs. per hour. This was continued for 24 hours. At the end of this period of time the effluent from the carbon bed contained the same amount of sulfur dioxide that was being fed to the carbon bed. The carbon bed was put back into service and functioned to adsorb free chlorine in the normal manner.

As can be seen from the above, the activated carbon which has been saturated with chlorine need not be disposed of or discarded as was heretofore used. Moreover, the time factors involved in regenerating the activated carbon is substantially reduced.

What is claimed is:

1. A process for regenerating activated carbon beds that have been saturated with adsorbed elemental chlorine comprising the steps of injecting sulfur dioxide into the chlorine saturated bed, reacting the sulfur dioxide with the elemental chlorine to form sulfuric acid and hydrochloric acid, continuing the injection of sulfur dioxide into the carbon beds until such time as the same amount of sulfur dioxide is in the effluent from the bed as was fed thereto which substantially removes the elemental chlorine from the carbon beds, thereafter purging the sulfuric acid formed within the bed.

2. The process as set forth in claim 1 wherein said elemental chlorine saturated carbon beds have been used in a process for treating an aqueous liquor containing hydrochloric acid and $SO_2$ with elemental chlorine applied in stoichiometric excess with respect to the sulfur dioxide to oxidize the sulfur dioxide to sulfuric acid, separating the sulfuric acid, then, removing the elemental chlorine from the hydrochloric acid liquor by passing the same through activated carbon beds.

* * * * *